Albert S. Putnam's

Brick Mould and Board.

No. 102862

PATENTED MAY 10 1870

Attest
H. S. Sprague
H. F. Eberts

Inventor.
A. S. Putnam
Per Atty
Thos. S. Sprague

United States Patent Office.

ALBERT T. PUTNAM, OF DETROIT, MICHIGAN.

Letters Patent No. 102,862, dated May 10, 1870.

IMPROVEMENT IN BRICK-MOLDS AND BOTTOM-BOARDS.

The Schedule referred to in these Letters Patent and making part of the same.

*To whom it may concern:*

Be it known that I, ALBERT T. PUTNAM, of Detroit, in the county of Wayne and State of Michigan, have invented a new and useful Improvement in Brick-Molds and Bottom-Boards; and I do declare that the following is a true and accurate description thereof, reference being had to the accompanying drawings and to the letters of reference marked thereon and being a part of this specification, in which—

Figure 1 is a plan view of my improved mold, and
Figure 2 is a plan of my bottom-board.

The nature of this invention relates to an improved construction of brick-molds and mold-boards, so that the necessity of turning the mold over to discharge the brick therefrom is avoided, by simply raising the mold and allowing the brick to remain upon the bottom-board, which is provided with openings through it coincident with the partitions of the mold, the spaces between the openings being left the size, in width, of the molds themselves.

This arrangement of the molds and bottom-board allows the brick to be molded upon the board, upon which they may remain to be dried preparatory to being burned, the openings above mentioned affording a free circulation of air upon the sides of the brick.

The arrangement also prevents the necessity of handling and turning the bricks upon the yard, thereby leaving them free from broken edges, &c., and nearly or quite as smooth as pressed brick.

In the ordinary method of manufacturing bricks, they are turned out of the molds upon the yard, and must be turned in order to dry; thereby injuring the bricks by breaking off the corners, and otherwise defacing them.

In the accompanying drawings—

Figure 1:
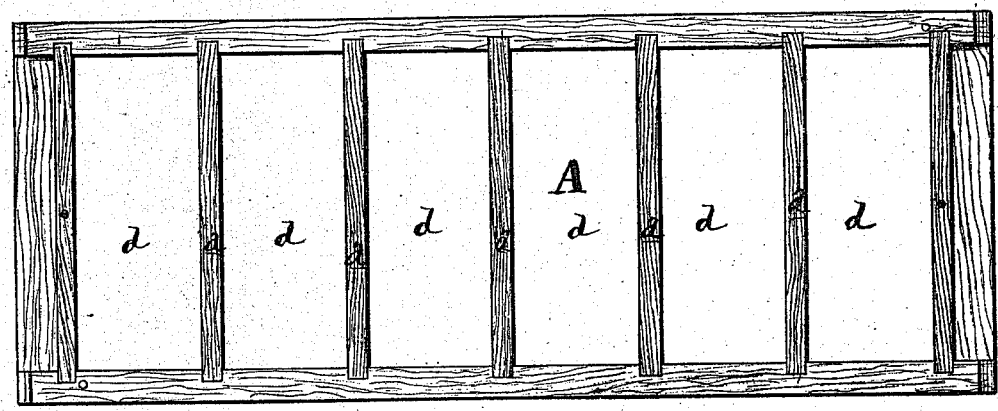
Fig. 1 represents a brick-mold, made of any suitable material, divided into equal compartments of the required size by the partitions $a$. This mold is made without "draw," the sides and ends being exactly vertical.
Figure 2:
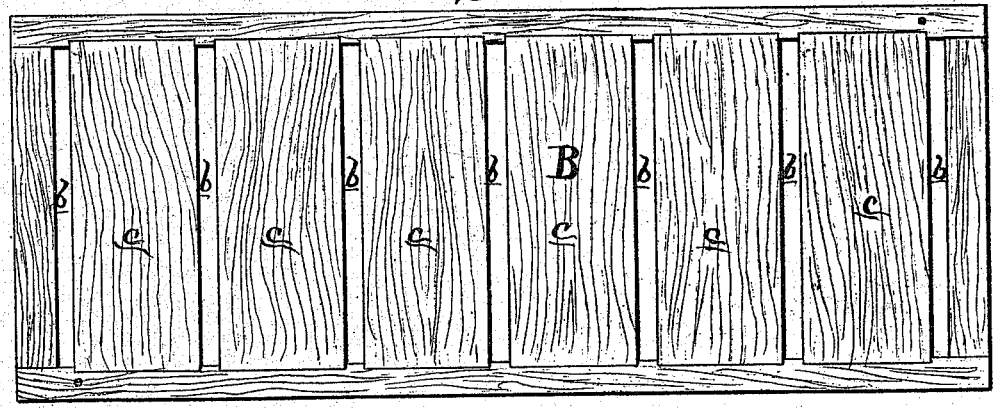
Fig. 2 represents a bottom-board of a proper size to fit the mold, and provided with openings, $b$, through it, which openings are coincident with the partitions $a$ in the mold, leaving solid spaces, $c$, between said openings, of the size of the compartments between said partitions.

Suitable guides or dowels may be employed to secure the fitting together of the mold and board.

What I claim as my invention, and desire to secure by Letters Patent, is—

The bottom-board B, provided with cross-pieces $c$ and openings $b$, in connection with the brick-mold A, provided with cross-partitions $a$ corresponding with the openings $b$, and with spaces $d$ corresponding with the cross-pieces $c$, when constructed and arranged to operate as and for the purposes set forth.

ALBERT T. PUTNAM.

Witnesses:
H. S. SPRAGUE,
H. F. EBERTS.